(12) United States Patent
Guo (10) Patent No.: US 8,767,750 B2
(45) Date of Patent: Jul. 1, 2014

(54) METHOD AND NODE DEVICE FOR NEGOTIATING ASSOCIATED CHANNEL CAPABILITY BETWEEN NODES (75) Inventor: Xinchun Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 13/284,591

(22) Filed: Oct. 28, 2011

(65) Prior Publication Data
US 2012/0093165 A1 Apr. 19, 2012

Related U.S. Application Data (63) Continuation of application No. PCT/CN2010/070899, filed on Mar. 7, 2010.

(30) Foreign Application Priority Data

Apr. 29, 2009 (CN) .......................... 2009 1 0136238

(51) Int. Cl.
H04L 12/26 (2006.01)
(52) U.S. Cl.
USPC ............ 370/400; 370/230; 370/252; 370/351
(58) Field of Classification Search
USPC .............. 370/229, 230, 230.1, 236, 400, 401, 370/464–465, 389, 392
See application file for complete search history.

(56) References Cited

U.S. PATENT DOCUMENTS 7,693,060 B2 * 4/2010 Polk et al. ..................... 370/231
8,279,749 B2 * 10/2012 Vasseur et al. ................ 370/217
2003/0189901 A1 * 10/2003 Ozugur et al. ................ 370/230
2004/0151159 A1 * 8/2004 Xu ................................ 370/351
2006/0259608 A1 * 11/2006 Kim et al. ..................... 709/223
2007/0195709 A1 * 8/2007 He ................................ 370/252

(Continued)

FOREIGN PATENT DOCUMENTS

CN 1449149 A 10/2003
CN 1510874 A 7/2004

(Continued)

OTHER PUBLICATIONS

Written Opinion of the International Searching Authority dated May 27, 2010 in connection with International Patent Application No. PCT/CN2010/070899.

(Continued)

Primary Examiner — Dang Ton
Assistant Examiner — Sai Aung (57) ABSTRACT

The present invention includes: receiving a Path message that is sent by an upstream node and carries an ACH of the upstream node; creating a new Path message and sending the new Path message to a downstream node, where the new Path message includes the ACH capability of the upstream node; receiving a Resv message that is sent by the downstream node and carries information about an ACH capability of the downstream node; and creating a new Resv message and sending the new Resv message to the upstream node, where the new Resv message includes the ACH of the downstream node. In the embodiments of the present invention, the ACH can be negotiated between nodes on an LSP so that a node on the LSP can know an ACH of another node, which avoids loss or erroneous forwarding of a special packet transmitted on an ACH.

12 Claims, 3 Drawing Sheets (56) References Cited

U.S. PATENT DOCUMENTS

2008/0075089 A1* 3/2008 Evans et al. ............... 370/395.52
2008/0151746 A1* 6/2008 Vasseur et al. ................ 370/228
2008/0198755 A1* 8/2008 Vasseur et al. ................ 370/248

FOREIGN PATENT DOCUMENTS

| CN | 1842034 A | 10/2006 |
|---|---|---|
| EP | 1 445 901 A1 | 8/2004 |
| EP | 1 727 316 A1 | 11/2006 |
| EP | 1 786 158 A1 | 5/2007 |

OTHER PUBLICATIONS

Partial Translation of Office Action dated Oct. 27, 2011 in connection with Chinese Patent Application No. 200910136238.6.
Supplementary European Search Report dated Mar. 15, 2012 in connection with European Patent Application No. EP 10 76 9226.
E. Bellagamba, et al., "Configuration of pro-active MPLS-TP Operations, Administration, and Maintenance (OAM) Functions Using RSVP-TE or LSP Ping draft-ietf-ccamp-rsvp-te-mpls-tp-oam-ext-01", CCAMP Working Group, Mar. 5, 2010, 19 pages.
I. Busi, et al., "MPLS-TP OAM based on Y.1731 draft-bhh-mpls-tp-oam-y1731-02.txt", MPLS Working Group, Mar. 24, 2009, 19 pages.
International Search Report dated May 27, 2010 in connection with International Patent Application No. PCT/CN2010/070899.
Partial Translation of Office Action dated Apr. 6, 2012 in connection with Chinese Patent Application No. 200910136238.6.
Communication pursuant to Article 94(3) EPC dated Apr. 12, 2013 in connection with European Patent Application No. 10 769 226.1.

* cited by examiner

METHOD AND NODE DEVICE FOR NEGOTIATING ASSOCIATED CHANNEL CAPABILITY BETWEEN NODES

CROSS-REFERENCE TO RELATED APPLICATIONS

This application is a continuation of International Application No. PCT/CN2010/070899, filed on Mar. 7, 2010, which claims priority to Chinese Patent Application No. 200910136238.6, filed with the Chinese Patent Office on Apr. 29, 2009 and entitled "METHOD AND NODE DEVICE FOR NEGOTIATING ASSOCIATED CHANNEL CAPABILITY BETWEEN NODES", both of which are incorporated herein by reference in their entireties.

TECHNICAL FIELD

The present invention relates to the field of communications technologies, and in particular, to a method and node device for negotiating an Associated Channel (ACH) capability between nodes.

BACKGROUND

A Resource Reservation Protocol-Traffic Engineering (RSVP-TE), as a supplement protocol to a Resource Reservation Protocol (RSVP), is used to set up a Label Switched Path (LSP) for a Multi-Protocol Label Switching (MPLS) network.

Figure 1:
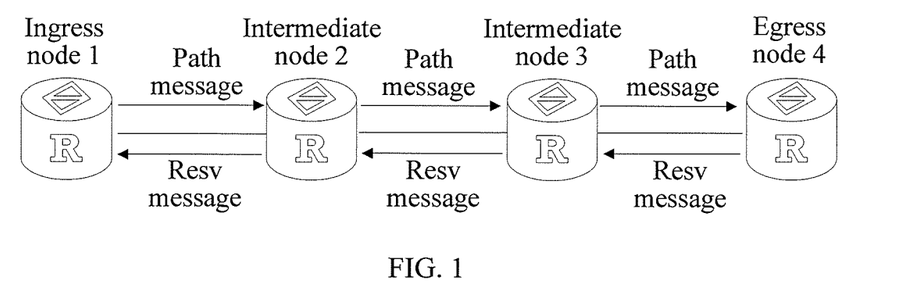
FIG. 1 is a schematic diagram of a setup of an LSP by using RSVP-TE.

The LSP that is set up by using RSVP-TE is capable of reserving resources, so that the services transmitted on the LSP are ensured. FIG. 1 is a schematic diagram of a setup of an LSP by using RSVP-TE. As shown in FIG. 1, two messages (a Path message and a Reserve (Resv) message) are required to set up an LSP by using RSVP-TE. A process of setting up an LSP may be briefly described as follows:

(1) An ingress node 1 generates a Path message, where the Path message may carry constraint information of setting up the LSP, and sends the Path message to an egress node 4.

(2) After receiving the Path message, the egress node 4 generates a Resv message, and returns the Resv message to the ingress node 1, and the Resv message is used to distribute labels and reserve resources on intermediate nodes 3 and 2 of the LSP.

(3) The ingress node 1 receives the Resv message, and the LSP is set up successfully.

Currently, an ACH may be used on a Pseudo Wire (PW) in an MPLS network to transmit connectivity detection information and connectivity verification information. In this way, a node that supports an MPLS-Transport Profile (TP) feature in the network may be discovered, and therefore the network is used, managed, and maintained more efficiently.

If the ACH is applied to the LSP, special packets, such as Operation, Administration and Maintenance (OAM) packets, Management Communication Channel (MCC) packets, Signaling Communication Channel (SCC) packets, and some Automatic Protection Switching (APS) packets, can be transmitted on the ACH. In this way, network management is unified, and operation is simplified. However, a prerequisite to transmitting special packets on the ACH is to negotiate an ACH capability between nodes on the LSP. If the ACH is directly used without negotiation, nodes that do not support the ACH capability may discard a received special packet or forward the packet to a user side, which leads to loss or erroneous forwarding of the packet transmitted on the ACH.

The inventor of the present invention finds that: No negotiation mechanism is available for negotiating the ACH capability between the nodes on the LSP, and therefore, a node is unaware of the ACH capability of another node and therefore unable to avoid loss or erroneous forwarding of a special packet transmitted on the ACH.

SUMMARY

Embodiments of the present invention provide a node and provide a method for negotiating an ACH capability between nodes to enable a node on an LSP to know an ACH capability of another node and avoid loss or erroneous forwarding of a special packet transmitted on an ACH.

An embodiment of the present invention provides a method for negotiating an ACH capability between nodes. The method includes:

receiving a Path message that is sent by an upstream node and carries an ACH capability of the upstream node;

creating a new Path message and sending the new Path message to a downstream node, where the new Path message includes the ACH capability of the upstream node;

receiving a Resv message that is sent by the downstream node and carries information about an ACH capability of the downstream node; and creating a new Resv message and sending the new Resv message to the upstream node, where the new Resv message includes the ACH capability of the downstream node.

An embodiment of the present invention provides a node device. The node device includes:

a first receiving unit, configured to receive a Path message that is sent by an upstream node and carries an ACH capability of the upstream node;

a creating and sending unit, configured to create a new Path message and send the new Path message to a downstream node, where the new Path message includes the ACH capability of the upstream node; and a second receiving unit, configured to receive a Resv message that is sent by the downstream node and carries information about an ACH capability of the downstream node; where the creating and sending unit is further configured to create a new Resv message and send the new Resv message to the upstream node, where the new Resv message includes the ACH capability of the downstream node.

In embodiments of the present invention, the Path message and the Resv message may carry an ACH capability of a node; when the Path message and the Resv message that carry the ACH capability of the node are used to set up an LSP, a node on the LSP knows the ACH capability of another node, which avoids loss or erroneous forwarding of a special packet such as an OAM packet, an MCC packet, an SCC packet, and an APS packet transmitted on the ACH.

DETAILED DESCRIPTION

Embodiment 1

Figure 2:
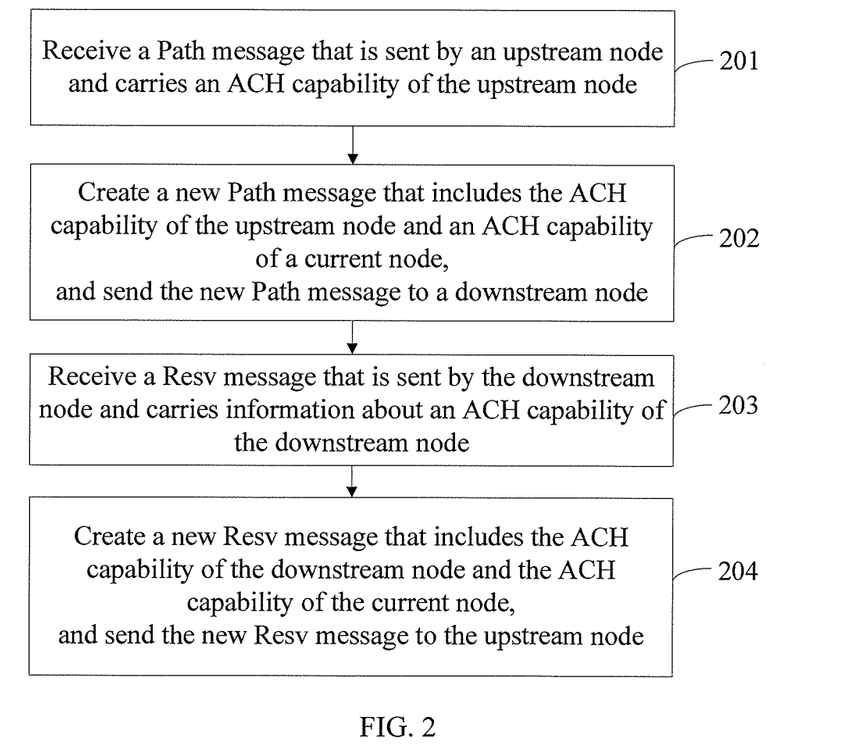
FIG. 2 is a flowchart of a method for negotiating an ACH capability between nodes according to an embodiment of the present invention.

FIG. 2 is a flowchart of a method for negotiating an ACH capability between nodes according to the first embodiment of the present invention. As shown in FIG. 2, the method may include:

201: A node receives a Path message that is sent by an upstream node and the Path message carries an ACH capability of the upstream node.

For example, in the Path message sent by the upstream node, a variable-length object field may be included, and the object field may carry the ACH capability of the upstream node.

With respect to a current node, there may be one or multiple upstream nodes. If there are multiple upstream nodes, the object field in the Path message that is received by the current node may carry ACH capabilities of the multiple upstream nodes.

It should be noted that: in this embodiment and subsequent embodiments, the node may be a Label Switching Router (LSR) on the LSP that is set up by using the Path message and a Resv message.

202: Create a new Path message that includes the ACH capability of the upstream node and an ACH capability of the current node, and send the new Path message to a downstream node.

For example, step 202 may include:
creating a new Path message;
writing the ACH capability of the upstream node and the ACH capability of the current node into a variable-length object field in the new Path message; and
sending the new Path message, into which the ACH capability of the upstream node and the ACH capability of the current node are written, to the downstream node.

203: Receive a Resv message that is sent by the downstream node and carries information about an ACH capability of the downstream node.

For example, in the Resv message sent by the downstream node, a variable-length object field may be included, and the object field may carry the ACH capability of the downstream node.

With respect to the current node, there may be one or multiple downstream nodes. If there are multiple downstream nodes, the object field in the Resv message that is received by the current node may carry ACH capabilities of the multiple downstream nodes.

204: Create a new Resv message that includes the ACH capability of the downstream node and the ACH capability of the current node, and sends the new Resv message to the upstream node.

For example, step 204 may include:
creating a new Resv message;
writing the ACH capability of the downstream node and the ACH capability of the current node into variable-length object field in the new Resv message; and
sending the new Resv message, into which the ACH capability of the downstream node and the ACH capability of the current node are written, to the upstream node.

Further, if the Resv message sent by the downstream node further carries the ACH capability of the upstream node and the ACH capability of the current node, after receiving the Resv message sent by the downstream node, the current node may create a new Resv message that includes the ACH capability of the downstream node, the ACH capability of the upstream node, and the ACH capability of the current node, and send the new Resv message to the upstream node.

Further, after performing step 201, the current node may read the ACH capability of the upstream node from the Path message sent by the upstream node, and store the capability information. In this way, the current node knows the ACH capability of the upstream node.

Similarly, after performing step 203, the current node may read the information about the ACH capability of the downstream node from the Resv message sent by the downstream node, and store it. In this way, the current node knows the ACH capability of the downstream node.

It should be noted that in RSVP-TE, formats of the Path message and the Resv message that are commonly used for setting up an LSP for an MPLS network are the same, and both have a generic header. The generic header of the Path message and the Resv message is shown in Table 1:

TABLE 1

| Vers | Flags | Msg Type | RSVP Checksum |
|------|-------|----------|---------------|
| Send-TTL | | Reserved | RSVP Length |

The meanings of the fields in Table 1 are as follows:
Vers: a version;
Flags: reserved flags;
Msg Type: a message type, for example, 1=Path; 2=Resv; 3=PathErr; 4=ResvErr; 5=PathTear; 6=ResvTear; 7=ResvConf.
RSVP Checksum: Resource Reservation Protocol checksum;
Send_TTL: an Internet Protocol (IP) time-to-live (TTL) value; and
RSVP Length: Resource Reservation Protocol length.

The generic header of the Path message and the Resv message may be followed by a variable-length object field which serves as a payload part. A format of an object field in the Path message and the Resv message is shown in Table 2:

TABLE 2

```
          0               1               2               3
+---------------+---------------+---------------+---------------+
|       Length (bytes)          |   Class-Num   |    C-Type     |
+---------------+---------------+---------------+---------------+
|                                                               |
//                      Object contents                        //
|                                                               |
+---------------+---------------+---------------+---------------+
```

The meanings of the fields in Table 2 are as follows:
Length: length;
Class-Num: an object type, with the two highest bits indicating how to process an unidentifiable object; and
C-Type: an object identifier (ID).

The length of an Object contents field in the object field in the Path message and the Resv message shown in Table 2 is variable, and therefore, a length of the object field is also variable.

The forgoing describes a method for negotiating an ACH capability between nodes in the first embodiment of the present invention. In this embodiment, the Path message and the Resv message may carry an ACH capability of a node; when the Path message and the Resv message that carry the ACH capability of the node are used to set up an LSP, the ACH capability is transparent among all nodes at both ends of the LSP and on the LSP. Therefore, a node knows an ACH capability of another node, which avoids loss or erroneous forwarding of a special packet such as an OAM packet, an MCC packet, an SCC packet, and an APS packet transmitted on the ACH.

Embodiment 2

The following, taking that an LSP is set up by using a Path message and a Resv message as illustrated in FIG. 1 as an example, describes a method for negotiating an ACH capability between nodes that is provided in this embodiment of the present invention. A node in this embodiment of the present invention is an LSR on the LSP that is set up by using the Path message and the Resv message.

As shown in FIG. 1, an ingress node 1 assembles a Path message, where the Path message carries an ACH capability of the ingress node 1, and sends the Path message to an intermediate node 2.

The ACH capability in this embodiment of the present invention may include: a capability of supporting a reserved label 13, a capability of supporting an ACH, a capability of supporting an ACH type (such as OAM, Automatic Protection Switching, a Management Control Channel, and a Command Control Channel), and a capability of supporting an OAM tool, such as LSP Ping and Bidirectional Forwarding (BFD), which transmits information by using the ACH. The Path message may use a bitmap to indicate whether a specific capability is supported.

The intermediate node 2 receives the Path message that carries the ACH capability of the ingress node 1, and copies the ACH capability of the ingress node 1 that is carried in the Path message to a reassembled Path message. Meanwhile, the intermediate node 2 adds its own ACH capability to the reassembled Path message, and sends the message to an intermediate node 3. After receiving the Path message sent by the ingress node 1, the intermediate node 2 may store the ACH capability of the ingress node 1.

Specifically, a header format of the Path message that is reassembled by the intermediate node 2 is the same as the header format shown in the foregoing Table 1, and an object field format of the Path message that is reassembled by the intermediate node 2 is the same as the object field format shown in Table 2. A format of an Object contents field in an object field of the Path message that is reassembled by the intermediate node 2 may be shown in Table 3:

TABLE 3

```
                    0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
//                          Sub-objects                        //
|                                                               |
+-+-+-+-+-+-+-+-+-+-+-+-+-+-+-+-+-+-+-+-+-+-+-+-+-+-+-+-+-+-+-+-+
```

In Table 3, a Sub-objects field is used for writing the ACH capabilities of the ingress node 1 and the intermediate node 2. A detailed format of the Sub-objects field may be further shown in Table 4:

TABLE 4

| 0 | 2 | 4 |
|---|---|---|
| ACH TLV Type | Length | |
| Node ACH sub-TLV | | |
| . . . | | |

In Table 4, each Node ACH sub-TLV (TLV is short for Type Length Value) includes an ID of a node, an interface ID of the node, and an interface ACH capability of the node. For example, in a Node ACH sub-TLV, both a V bit and a U bit need to be set to 1. In this way, an intermediate node that does not support an ACH capability of this node is enabled to transparently transmit the ACH capability of this node. In this embodiment of the present invention, an ACH capability of a node is composed of all interface channel control capabilities of this node. As shown in Table 4, ACH capabilities of multiple nodes may be written into a Sub-objects field. A format of a single Node ACH sub-TLV may be shown in Table 5:

TABLE 5

| Node ACH Sub-TLV Type | Length |
|---|---|
| Node ID | |
| Interface 1 ID | |
| Bitmap of an ACH capability parameter of interface 1 | |
| Interface 2 ID | |
| Bitmap of an ACH capability parameter of interface 2 | |
| . . . | |

The meanings of the fields in Table 5 are as follows:
Node ACH Sub-TLV Type: a type of an ACH capability of the node;
Length: length;
Node ID: a node address; and
Interface ID: an IPv4 address, or an IPv6 or an interface index of the interface.

The intermediate node 3 receives the Path message that is sent by the intermediate node 2 and carries the ACH capabilities of the intermediate node 2 and the ingress node 1, and copies the ACH capabilities of the intermediate node 2 and the ingress node 1 that is carried in the Path message to a reassembled Path message. Meanwhile, the intermediate node 3 adds its own ACH capability to the reassembled Path message, and sends the message to an egress node 4. After receiving the Path message that is sent by the intermediate node 2 and carries the ACH capabilities of the intermediate node 2 and the ingress node 1, the intermediate node 3 may store the ACH capabilities of the intermediate node 2 and the ingress node 1.

After receiving the Path message that is sent by the intermediate node 3 and carries the ACH capabilities of the intermediate node 3, the intermediate node 2, and the ingress node 1, the egress node 4 stores the ACH capabilities of the intermediate node 3, the intermediate node 2, and the ingress node 1. Meanwhile, the egress node 4 assembles a Resv message, and sends it to the upstream intermediate node 3.

The Resv message sent by the egress node 4 to the intermediate node 3 may take either of the following forms:

Form 1:

The egress node 4 assembles a Resv message, where the Resv message carries only an ACH capability of the egress node 4, and sends the Resv message to the intermediate node 3.

The intermediate node 3 receives the Resv message that carries the ACH capability of the egress node 4, and copies the ACH capability of the egress node 4 that is carried in the Resv message to a reassembled Resv message. Meanwhile, the intermediate node 3 adds its own ACH capability to the reassembled Resv message, and sends the message to the intermediate node 2. After receiving the Resv message sent by the egress node 4, the intermediate node 3 may store the ACH capability of the egress node 4.

The intermediate node 2 receives the Resv message that is sent by the intermediate node 3 and carries the ACH capabilities of the intermediate node 3 and the egress node 4, and copies the ACH capabilities of the intermediate node 3 and the egress node 4 that is carried in the Resv message to a reassembled Resv message. Meanwhile, the intermediate node 2 adds its own ACH capability to the reassembled Resv message, and sends the message to the ingress node 1. After receiving the Resv message that is sent by the intermediate node 3 and carries the ACH capabilities of the intermediate node 3 and the egress node 4, the intermediate node 2 may store the ACH capabilities of the intermediate node 3 and the egress node 4.

After receiving the Resv message that is sent by the intermediate node 2 and carries the ACH capabilities of the intermediate node 2, the intermediate node 3, and the egress node 4, the ingress node 1 stores the ACH capabilities of the intermediate node 2, the intermediate node 3, and the egress node 4.

Form 2:

After receiving the Path message that is sent by the intermediate node 3 and carries the ACH capabilities of the intermediate node 3, the intermediate node 2, and the ingress node 1, the egress node 4 copies the ACH capabilities of the intermediate node 3, the intermediate node 2, and the ingress node 1 that is carried in the Path message to a reassembled Resv message. Meanwhile, the egress node 4 adds its own ACH capability to the reassembled Resv message, and sends the message to the intermediate node 3.

After receiving the Resv message that is sent by the egress node 4 and carries the ACH capabilities of the egress node 4, the intermediate node 3, the intermediate node 2, and the ingress node 1, the intermediate node 3 may store the ACH capabilities of the egress node 4, the intermediate node 2, and the ingress node 1, copy the ACH capabilities of the egress node 4, the intermediate node 3, the intermediate node 2, and the ingress node 1 that is carried in the Resv message sent by the egress node 4 to a reassembled Resv message, and forward the message to the intermediate node 2.

After receiving the Resv message that is sent by the intermediate node 3 and carries the ACH capabilities of the egress node 4, the intermediate node 3, the intermediate node 2, and the ingress node 1, the intermediate node 2 may store the ACH capabilities of the egress node 4, the intermediate node 3, and the ingress node 1, copy the ACH capabilities of the egress node 4, the intermediate node 3, the intermediate node 2, and the ingress node 1 that is carried in the Resv message sent by the intermediate node 3 to a reassembled Resv message, and forward the message to the intermediate node 1.

After receiving the Resv message that is sent by the intermediate node 2 and carries the ACH capabilities of the egress node 4, the intermediate node 3, the intermediate node 2, and the ingress node 1, the ingress node 1 may store the ACH capabilities of the intermediate node 2, the intermediate node 3, and the egress node 4.

Therefore, the Resv message in form 1 and form 2 enables nodes on the LSP to know an ACH capability of each other, and enables transparent transmission of ACH capability information on the LSP.

In addition, the format of the Node ACH sub-TLV shown in Table 5 of an embodiment of the present invention may also be shown in Table 6:

TABLE 6

| Node ACH Sub-TLV Type | Length |
|---|---|
| Node ID | |
| Interface ACH Sub-TLV | |
| ... | |

The meanings of the fields in Table 6 are as follows:

Node ACH Sub-TLV Type: a type of an ACH capability of the node;

Length: length;

Node ID: a node ID; and

Interface ACH Sub-TLV: an ACH capability of an interface.

That is, the Node ACH sub-TLV of each node shown in Table 5 includes interface ACH Sub-TLVs of multiple interfaces. A format of the Interface ACH sub-TLV of each interface is shown in Table 7:

TABLE 7

| Interface ACH Sub-TLV | Length |
|---|---|
| Interface 1 ID | |
| Bitmap of an ACH capability parameter of interface 1 | |
| Interface 2 ID | |
| Bitmap of an ACH capability parameter of interface 2 | |
| ... | |

In Table 7, an interface ID may be an IPv4 address, an IPv6 or an interface index of the interface.

It should be noted that all tables provided in this embodiment of the present invention are exemplary only, and are designed to describe the embodiment of the present invention. Those skilled in the art may adjust such tables to meet a specific requirement.

It should be noted that the method provided in this embodiment of the present invention is also applicable to a scenario of a unidirectional LSP. For example, the Path message sent by the ingress node 1 to the egress node 4 may not be extended, and only the Resv message sent by the egress node to the ingress node may be extended so that the Resv message sent by the egress node to the ingress node carries an ACH capability of a downstream node.

Alternatively, the Path message sent by the ingress node 1 to the egress node 4 may be extended so that the Path message sent by the ingress node 1 to the egress node 4 carries an ACH capability of an upstream node, but the Resv message sent by the egress node to the ingress node may not be extended.

In this embodiment, the Path message and the Resv message that are used for setting up the LSP are extended so that the extended Path message and the extended Resv message may carry an ACH capability of a node. When the extended Path message and the extended Resv message are used to set up an LSP, the ACH capability is transparent among all nodes at both ends of the LSP and on the LSP, and a node knows an ACH capability of another node, which avoids loss or erroneous forwarding of a special packet such as an OAM packet, an MCC packet, an SCC packet, and an APS packet transmitted on the ACH.

Embodiment 3

Figure 3:
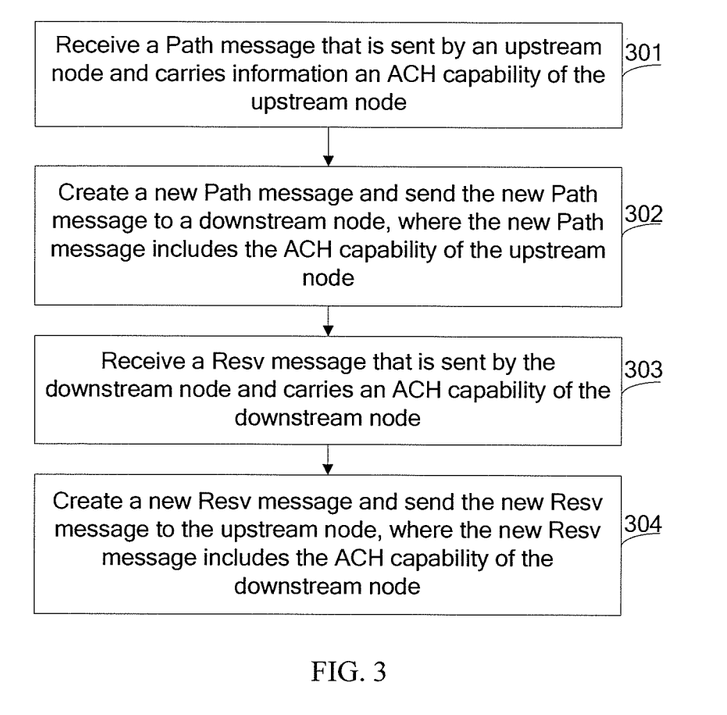
FIG. 3 is a flowchart of another method for negotiating an ACH capability between nodes according to an embodiment of the present invention.

FIG. 3 is a flowchart of a method for negotiating an ACH capability between nodes according to a third embodiment of the present invention. As shown in FIG. 3, the method may include:

301: Receive a Path message that is sent by an upstream node and carries an ACH capability of the upstream node.

For example, in the Path message sent by the upstream node, a variable-length object field may be included, and the object field may carry the ACH capability of the upstream node.

302: Create a new Path message and send the new Path message to a downstream node, where the new Path message includes the ACH capability of the upstream node.

For example, step 302 may include:
creating a new Path message;
writing the ACH capability of the upstream node into a variable-length object field in the new Path message; and
forwarding the new Path message, into which the ACH capability of the upstream node is written, to the downstream node.

303: Receive a Resv message that is sent by the downstream node and carries information about an ACH capability of the downstream node.

For example, in the Resv message sent by the downstream node, a variable-length object field may be included, and the object field may carry the ACH capability of the downstream node.

304: Create a new Resv message and send the new Resv message to the upstream node, where the new Resv message includes the ACH capability of the downstream node.

For example, step 304 may include:
creating a new Resv message;
writing the ACH capability of the downstream node into a variable-length object field in the new Resv message; and
sending the new Resv message, into which the ACH capability of the downstream node is written, to the upstream node.

The node ACH capability in this embodiment is the same as that described in the foregoing second embodiment, and is not described here.

A structure of the Path message that carries the information about the ACH capability of the upstream node and a structure of the Resv message that carries the information about the ACH capability of the downstream node in this embodiment are the same as those described in the previous embodiment, and are also not described here.

The detailed steps of creating a new Path message that includes the ACH capability of the upstream node, forwarding the new Path message to the downstream node, creating a new Resv message that includes the ACH capability of the downstream node, and forwarding the new Resv message to the upstream node in this embodiment are the same as those described in the previous embodiment, and are also not described here.

The following, taking that an LSP is set up by using a Path message and a Resv message as illustrated in FIG. 1 as an example, describes a method for negotiating an ACH capability between nodes that is provided in this embodiment of the present invention. A node in this embodiment is an LSR on the LSP that is set up by using the Path message and the Resv message.

As shown in FIG. 1, an ingress node 1 assembles a Path message, where the Path message carries an ACH capability of the ingress node 1, and sends the Path message to an intermediate node 2.

After receiving the Path message that carries the ACH capability of the ingress node 1, the intermediate node 2 creates a new Path message, writes the ACH capability of the ingress node 1 into a variable-length object field in the new Path message, and forwards the new Path message, into which the ACH capability of the ingress node 1 is written, to an intermediate node 3.

After receiving the Path message that carries the ACH capability of the ingress node 1, the intermediate node 3 creates a new Path message, writes the ACH capability of the ingress node 1 into a variable-length object field in the new Path message, and forwards the new Path message, into which the ACH capability of the ingress node 1 is written, to an egress node 4.

After receiving the Path message that carries the ACH capability of the ingress node 1 from the intermediate node 3, the egress node 4 stores the ACH capability of the ingress node 1. Meanwhile, the egress node 4 adds only its own ACH capability to a reassembled Resv message, and sends the message to the intermediate node 3.

After receiving the Resv message that is sent by the egress node 4 and carries the ACH capability of the egress node 4, the intermediate node 3 creates a new Resv message, writes the ACH capability of the egress node 4 into a variable-length object field in the new Resv message, and forwards the new Resv message, into which the ACH capability of the egress node 4 is written, to the intermediate node 2.

After receiving the Resv message that is sent by the intermediate node 3 and carries the ACH capability of the egress node 4, the intermediate node 2 creates a new Resv message, writes the ACH capability of the egress node 4 into a variable-length object field in the new Resv message, and forwards the new Resv message, into which the ACH capability of the egress node 4 is written, to the ingress node 1.

After receiving the Resv message that is sent by the intermediate node 2 and carries the ACH capability of the egress node 4, the ingress node 1 stores the ACH capability of the egress node 4.

In the method for negotiating the ACH capability between nodes that is provided in this embodiment, the intermediate may not add its own ACH capability, and transparently transmits the received ACH capability information.

In this embodiment, the extended Path message and the extended Resv message may carry an ACH capability of a node; when the Path message and the Resv message are used to set up an LSP, an end to end ACH capability may be negotiated between nodes on the LSP, which avoids loss or erroneous forwarding of a special packet such as an OAM packet, an MCC packet, an SCC packet, and an APS packet transmitted on the ACH.

Embodiment 4

Figure 4:
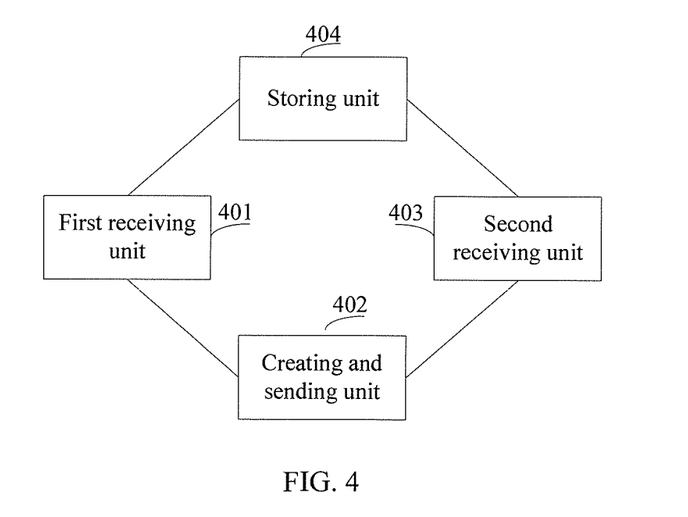
FIG. 4 is a block diagram of a node device according to an embodiment of the present invention.

FIG. 4 is a block diagram of a node device according to a fourth embodiment of the present invention. The node device provided in this embodiment may be an LSR on an LSP. As shown in FIG. 4, the node device may include:

a first receiving unit 401, configured to receive a Path message that is sent by an upstream node and carries information about an ACH capability of the upstream node;

a creating and sending unit 402, configured to create a new Path message that includes the ACH capability of the upstream node and an ACH capability of a current node and send the new Path message to a downstream node; and a second receiving unit 403, configured to receive a Resv message that is sent by the downstream node and carries information about an ACH capability of the downstream node; where the creating and sending unit 402 is further configured to create a new Resv message that includes the ACH capability of the downstream node and the ACH capability of the current node and send the new Resv message to the upstream node.

For example, the creating and sending unit 402 may be configured to:

create a new Path message;

write the ACH capability of the upstream node and the ACH capability of the current node into a variable-length object field in the new Path message; and send the new Path message, into which the ACH capability of the upstream node and the ACH capability of the current node are written, to the downstream node.

For example, the creating and sending unit 402 may be configured to:

create a new Resv message;

write the ACH capability of the downstream node and the ACH capability of the current node into a variable-length object field in the new Resv message; and send the new Resv message, into which the ACH capability of the downstream node and the ACH capability of the current node are written, to the upstream node.

Further, if the Resv message that is sent by the downstream node and received by the second receiving unit 403 further carries the ACH capability of the upstream node, the creating and sending unit 402 is further configured to create a new Resv message that includes the ACH capability of the downstream node, the ACH capability of the upstream node, and the ACH capability of the current node and send the new Resv message to the upstream node.

Preferably, the node device provided in this embodiment may further include:

a storing unit 404, configured to store the ACH capability of the upstream node after the first receiving unit 401 receives the Path message that is sent by the upstream node and carries the ACH capability of the upstream node.

Further, the storing unit 404 is configured to store the ACH capability of the downstream node after the second receiving unit 402 receives the Resv message that is sent by the downstream node and carries the information about the ACH capability of the downstream node.

The foregoing describes the node device provided in this embodiment of the present invention in detail. Through the node device provided in this embodiment, the Path message and the Resv message may carry an ACH capability of a node; when the Path message and the Resv message are used to set up an LSP, the ACH capability is transparent among all nodes at both ends of the LSP and on the LSP. Therefore, a node knows an ACH capability of another node, which avoids loss or erroneous forwarding of a special packet such as an OAM packet, an MCC packet, an SCC packet, and an APS packet transmitted on the ACH.

Embodiment 5

Figure 5:
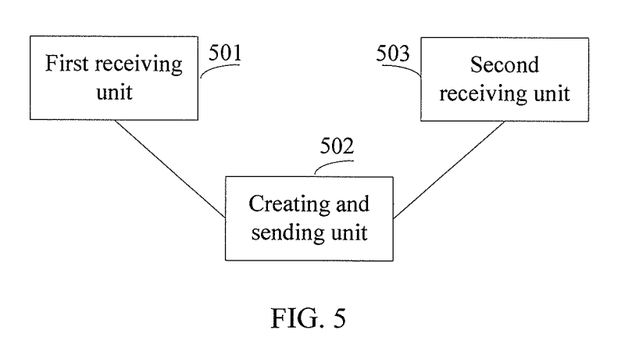
FIG. 5 is a block diagram of another node device according to an embodiment of the present invention.

FIG. 5 is a block diagram of a node device according to a fifth embodiment of the present invention. The node device provided in this embodiment may be an LSR on an LSP. As shown in FIG. 5, the node device may include a first receiving unit 501, a creating and sending unit 502, and a second receiving unit 503.

The first receiving unit 501 is configured to receive a Path message that is sent by an upstream node and carries an ACH capability of the upstream node.

For example, in the Path message sent by the upstream node, a variable-length object field may be included, and the object field may carry the ACH capability of the upstream node.

The creating and sending unit 502 is configured to create a new Path message that includes the ACH capability of the upstream node and send the new Path message to the downstream node.

The second receiving unit 503 is configured to receive a Resv message that is sent by the downstream node and carries information about an ACH capability of the downstream node.

For example, in the Resv message sent by the downstream node, a variable-length object field may be included, and the object field may carry the ACH capability of the downstream node.

The creating and sending unit 502 is further configured to create a new Resv message that includes the ACH capability of the downstream node and send the new Resv message to the upstream node.

The control channel capability of a node in this embodiment is the same as that described in the foregoing second embodiment, and is not described here.

A structure of the Path message that carries the information about the ACH capability of the upstream node and a structure of the Resv message that carries the information about the ACH capability of the downstream node in this embodiment are the same as those described in the previous embodiment, and are not described here.

The foregoing describes the node device provided in this embodiment of the present invention in detail. Through the node device provided in this embodiment, the Path message and the Resv message may carry an ACH capability of a node; when the Path message and the Resv message are used to set up an LSP, an end to end ACH capability may be negotiated between nodes on the LSP. Therefore, a node knows an ACH capability of another node, which avoids loss or erroneous forwarding of a special packet such as an OAM packet, an MCC packet, an SCC packet, and an APS packet transmitted on the ACH.

A person skilled in the art may understand that all or part of the steps of the methods according to the embodiments of the present invention may be implemented by a program instructing relevant hardware. The program may be stored in a computer readable storage medium. When being executed, the program performs the steps of the methods specified in the embodiments of the present invention. The storage medium may be a medium that is capable of storing a program code, such as a Read Only Memory (ROM), a Random Access Memory (RAM), a magnetic disk, or a Compact Disk-Read Only Memory (CD-ROM).

The forgoing describes a method and node device for negotiating the ACH capability between nodes according to the embodiments of the present invention. Although being described by using exemplary embodiments, the present invention is not limited to such embodiments. It is apparent that a person skilled in the art may make modifications and variations to the present invention without departing from the spirit and scope of the invention. The present invention is intended to cover the modifications and variations provided that they fall within the scope of protection defined by the following claims or their equivalents.

What is claimed is:

1. A method for negotiating an Associated Channel (ACH) information between nodes, the method comprising:
   receiving, by a current node, a Path message that is sent by an upstream node and carries an ACH information of the upstream node;
   creating, by the current node, a new Path message and sending the new Path message to a downstream node, wherein the new Path message comprises the ACH information of the upstream node and an ACH information of the current node;
   receiving, by the current node, a Reserve (Resv) message that is sent by the downstream node and carries information about an ACH information of the downstream node;
   creating, by the current node, a new Resv message and sending the new Resv message to the upstream node, wherein the new Resv message comprises the ACH information of the downstream node and the ACH information of the current node;
   wherein the ACH information of the upstream node comprises:
   an information of supporting a reserved label, an information of supporting an ACH, an information of supporting an ACH type and an information of supporting an Administration and Maintenance (OAM) tool:
   wherein the ACH information of the current node comprises:
   an information of supporting a reserved label, an information of supporting an ACH, an information of supporting an ACH type and an information of supporting an OAM tool; and
   wherein the ACH information of the downstream node comprises:
   an information of supporting a reserved label, an information of supporting an ACH, an information of supporting an ACH type and an information of supporting an OAM tool.

2. The method according to claim 1, wherein creating the new Path message and sending the new Path message to the downstream node comprises: creating a new Path message that carries a variable-length object field; writing the ACH information of the upstream node and the ACH information of the current node into the object field in the Path message that carries the variable-length object field; and sending the Path message to the downstream node, wherein the Path message carries the variable-length object field, and the ACH information of the upstream node and the ACH information of the current node are written into the Path message.

3. The method according to claim 1, wherein creating the new Resv message and sending the new Resv message to the upstream node comprises: creating a new Resv message that carries a variable-length object field; writing the ACH information of the downstream node and the ACH information of the current node into the object field in the Resv message that carries the variable-length object field; and sending the Resv message to the upstream node, wherein the Resv message carries the variable-length object field, and the ACH information of the downstream node and the ACH information of the current node are written into the Resv message.

4. The method according to claim 1, wherein if the Resv message sent by the downstream node further carries the ACH information of the upstream node, the new Resv message further comprises the ACH information of the upstream node.

5. The method according to claim 1, wherein after the receiving the Path message that is sent by the upstream node and carries the ACH information of the upstream node, the method further comprises: storing the ACH information of the upstream node.

6. The method according to claim 1, wherein after the receiving the Resv message that is sent by the downstream node and carries the information about the ACH information of the downstream node, the method further comprises: storing the ACH information of the downstream node.

7. A first node device operated by a processor to execute instructions stored in a memory, comprising:
   a first receiving unit, the processor configured to receive a Path message that is sent by an upstream node and carries an Associated Channel (ACH) information of the upstream node;
   a creating and sending unit, the processor configured to create a new Path message and send the new Path message to a downstream node, wherein the new Path message comprises the ACH information of the upstream node and an ACH information of the first node device;
   a second receiving unit, the processor configured to receive a Reserve (Resv) message that is sent by the downstream node and carries information about an ACH information of the downstream node; wherein
   the creating and sending unit is configured to create a new Resv message and send the new Resv message to the upstream node, wherein the new Resv message comprises the ACH information of the downstream node and the ACH information of the first node device;
   wherein the ACH information of the upstream node comprises:
   an information of supporting a reserved label, an information of supporting an ACH, an information of supporting an ACH type and an information of supporting an Administration and Maintenance (OAM) tool;
   wherein the ACH information of the first node device comprises:
   an information of supporting a reserved label, an information of supporting an ACH, an information of supporting an ACH type and an information of supporting an OAM tool; and wherein the ACH information of the downstream node comprises:

an information of supporting a reserved label, an information of supporting an ACH, an information of supporting an ACH type and an information of supporting an OAM tool.

8. The first node device according to claim 7, wherein the creating and sending unit is configured to:
   create a new Path message that carries a variable-length object field;
   write the ACH information of the upstream node and the ACH information of the first node device into the object field in the Path message that carries the variable-length object field; and
   send the Path message to the downstream node, wherein the Path message carries the variable-length object field, and the ACH information of the upstream node and the ACH information of the first node device are written into the Path message.

9. The first node device according to claim 7, wherein the creating and sending unit is configured to:
   create a new Resv message that carries a variable-length object field;
   write the ACH information of the downstream node and the ACH information of the first node device into the object field in the Resv message that carries the variable-length object field; and
   send the Resv message to the upstream node, wherein the Resv message carries the variable-length object field, and the ACH information of the downstream node and the ACH information of the first node device are written into the Resv message.

10. The first node device according to claim 7, wherein if the Resv message that is sent by the downstream node and received by the second receiving unit further carries the ACH information of the upstream node, the new Resv message created by the creating and sending unit further comprises the ACH information of the upstream node.

11. The first node device according to claim 7, further comprising:
   a storing unit, the processor configured to store the ACH information of the upstream node after the first receiving unit receives the Path message that is sent by the upstream node and carries the ACH information of the upstream node.

12. The first node device according to claim 11, wherein the storing unit is further configured to store the ACH information of the downstream node after the second receiving unit receives the Resv message that is sent by the downstream node and carries the information about the ACH information of the downstream node.

* * * * *